United States Patent [19]
Brekelmans

[11] Patent Number: 5,710,993
[45] Date of Patent: Jan. 20, 1998

[54] COMBINED TV/FM RECEIVER

[75] Inventor: Johannes H. A. Brekelmans, Singapore, Singapore

[73] Assignee: U.S. Philips Corporation, New York, N.Y.

[21] Appl. No.: 575,536

[22] Filed: Dec. 20, 1995

[30] Foreign Application Priority Data

Dec. 23, 1994 [EP] European Pat. Off. .............. 94203743

[51] Int. Cl.$^6$ .................... H04B 1/18; H04N 5/46
[52] U.S. Cl. .................... 455/188.1; 455/189.1; 455/180.1; 455/180.3; 455/183.1; 455/260; 348/729; 348/735
[58] Field of Search .................. 455/188.1, 19.1, 455/180.1, 180.3, 183.1, 196.1, 197.1, 205, 255, 257, 260, 266, 318; 348/729, 735

[56] References Cited

U.S. PATENT DOCUMENTS

| | | | |
|---|---|---|---|
| 4,272,788 | 6/1981 | Ogita | 348/729 |
| 4,596,963 | 6/1986 | Lawton et al. | 331/14 |
| 4,823,399 | 4/1989 | George | 455/316 |
| 4,855,835 | 8/1989 | Tobita | 455/316 |
| 5,144,439 | 9/1992 | Wignot | 348/729 |

FOREIGN PATENT DOCUMENTS 57-155885  9/1982  Japan .

Primary Examiner—Donnie L. Crosland
Attorney, Agent, or Firm—Edward W. Goodman

[57] ABSTRACT

An arrangement for receiving both TV and FM broadcast signals, particularly suited for multi-media applications. In the arrangement, a standard TV tuner (TUN) effects a first frequency conversion of an FM broadcast signal. A combination of a mixer (MP2) and an oscillator (VCO) effects a second frequency conversion of the FM broadcast signal. In order to keep the arrangement relatively simple, the oscillator (VCO) is included in a phase-lock loop (PLL), which is used for synchronous detection of a TV intermediate frequency signal. The phase-lock loop (PLL) includes a switch (SW) for deactivating the phase-lock loop (PLL) in the case of FM broadcast signal reception, such that the oscillator (VCO) is effectively free running.

4 Claims, 1 Drawing Sheet

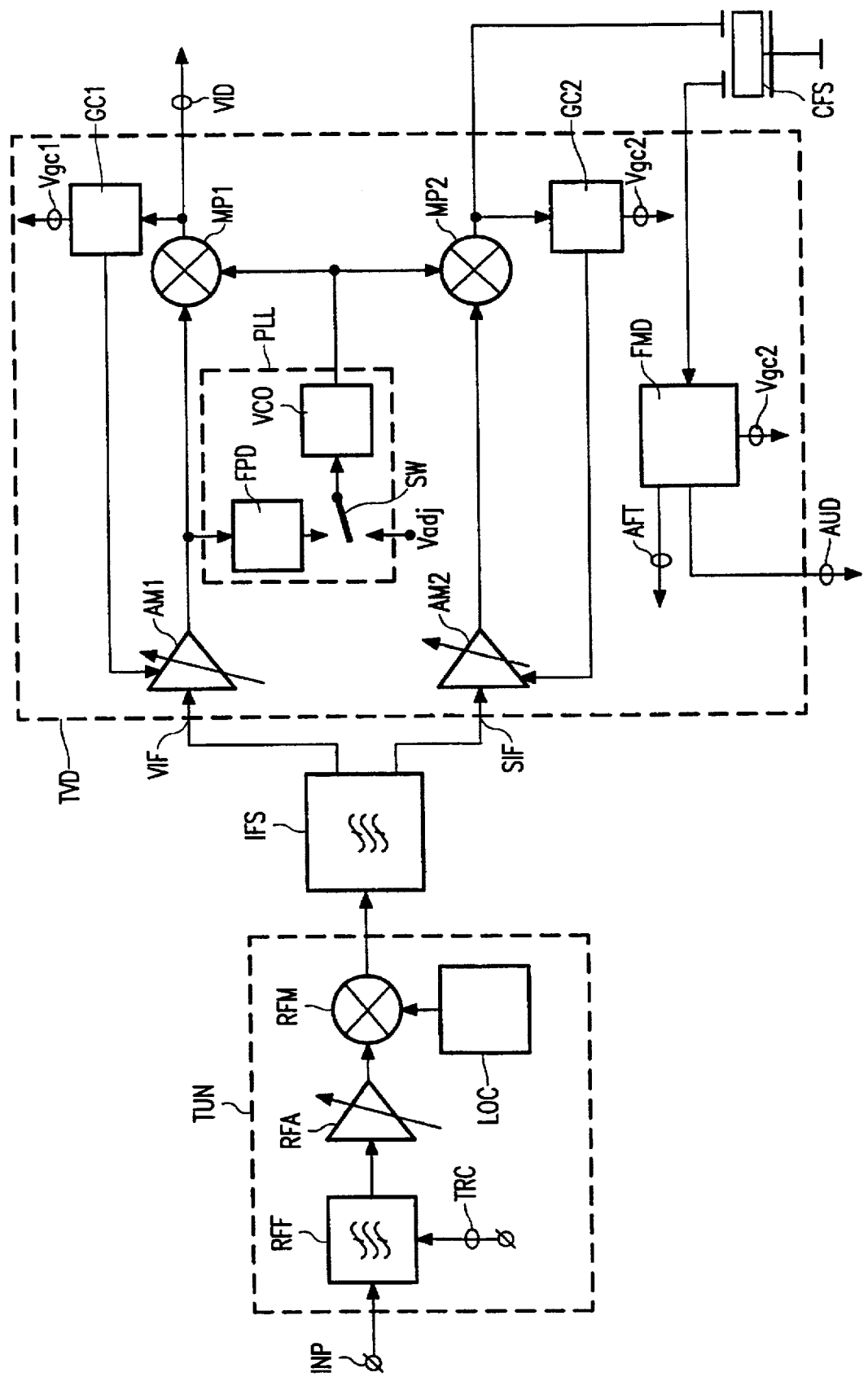

COMBINED TV/FM RECEIVER

BACKGROUND OF THE INVENTION

1. Field of the Invention

The invention relates to an arrangement for receiving both TV and FM broadcast signals. Such an arrangement may be incorporated in a multi-media apparatus, to enhance the functionality of the apparatus with TV and FM broadcast reception. The multi-media apparatus may be in the form of a personal computer (PC) having slots in which special function boards are plugged in. The arrangement may be housed on one of these special function boards. Accordingly, the PC can access information transmitted by FM radio and TV stations.

A typical TV receiver comprises a TV tuner coupled to a TV detection section via an intermediate frequency (IF) section. The TV tuner provides a TV IF carrier in response to a received TV broadcast signal. The TV detection section derives both picture and sound information from the TV IF carrier. In many TV standards, the modulation of the TV IF carrier is a composite comprising a TV sound carrier which is frequency modulated (FM).

Basically, there are two schemes for deriving sound information from the TV IF carrier. A first scheme uses a common TV IF detector for deriving both sound and picture information. A TV sound channel, which comprises an FM demodulator, is coupled to the common TV IF detector. The TV sound channel derives baseband audio from the TV sound carrier provided by the common TV IF detector. The first scheme is often referred to as inter-carrier sound demodulation (ICS).

A second scheme uses two separate TV IF detectors for deriving sound and picture information, respectively. In this scheme, the TV sound channel is, of course, coupled to TV IF detector which derives the TV sound carrier from the TV IF carrier. The second scheme is often referred to as quasi split sound (QSS).

2. Description of the Related Art

U.S. Pat. No. 5,144,139 describes an arrangement for receiving both TV and FM broadcast signals. In the known arrangement, the FM broadcast reception is of the double conversion type. An additional filter-multiplier-oscillator combination is coupled between the TV tuner and the TV sound channel. For FM broadcast reception, the TV tuner performs a first frequency conversion and a second frequency conversion is effected in the additional filter-multiplier-oscillator combination.

A drawback of the known arrangement is that an appreciable amount of circuitry needs to be added to standard television receiver circuitry to make it suitable for FM reception.

SUMMARY OF THE INVENTION

An object of the invention is, inter alia, to provide an arrangement for receiving both TV and FM broadcast signals of relatively simple structure. An arrangement of this type, for receiving both TV and FM broadcast signals, comprises a TV tuner for a first frequency conversion of an FM broadcast signal, and a combination of a mixer and an oscillator for a second frequency conversion of the FM broadcast signal, characterized in that said oscillator is included in a phase-lock loop for synchronous detection of a TV intermediate frequency signal, and in that said phase-lock loop comprises means for de-activating the phase-lock loop in the case of FM broadcast signal reception. A second aspect of the invention defines a multi-media apparatus comprising such an arrangement. An advantageous embodiment is characterized in that said mixer is part of a TV detection section arranged for Quasi Split Sound TV sound detection.

In the invention, a phase lock-loop (PLL), which is used for synchronous detection of the TV IF carrier, is de-activateable. The PLL includes an oscillator coupled to a multiplier which functions as the TV IF detector that is coupled to the TV sound channel. When TV reception is required, the PLL is active and synchronizes the oscillator with the TV IF carrier to be demodulated. When FM broadcast reception is desired, the PLL is de-activated to make the oscillator effectively free-running.

For example, in the invention, addition of a switch for de-activating the PLL, makes the TV IF detector suitable to effect the second frequency conversion for FM broadcast reception. This in contrast to the prior art arrangement which requires a full filter-mixer-oscillator combination to effect the same.

Advantageously, the TV IF detector is incorporated in a TV detection section according to the QSS scheme. In the QSS scheme, the TV IF detector for sound demodulation may be coupled to the TV tuner via a relatively narrow-band filter. Narrow-band means that the filter bandwidth is substantially lower than the bandwidth of the TV IF carrier, which is approximately 6 MHz. In FM broadcast reception, the narrow-band filter attenuates strong signals which are frequency adjacent to the desired FM broadcast signal. Accordingly, an overdrive of the TV IF detector, which effects the second frequency conversion in FM broadcast reception, is prevented.

These and other aspects of the invention will be apparent from and elucidated with reference to the embodiment described hereinafter and shown in the single Figure.

BRIEF DESCRIPTION OF THE DRAWING

The Figure shows, in a block diagram form, an embodiment of a receiver in accordance with the subject invention.

DESCRIPTION OF THE PREFERRED EMBODIMENT

The arrangement shown in the Figure comprises three main functional parts: a TV tuner TUN, an IF section IFS and a TV detection section TVD having an input VIF and an input SIF.

In the case of TV reception, the TV tuner TUN frequency converts a TV signal in the VHF or UHF band which is present at input INP. The frequency converted TV signal passes the IF section IFS, which splits this signal up into two IF signals at inputs VIF and SIF, respectively. The IF signal at the input VF comprises the TV IF carrier with video modulation components. The IF signal at the input SIF comprises TV sound modulation components of the TV IF carrier.

In the TV detector section TVD, multipliers MP1 and MP2 synchronously detect the IF signals at inputs VIF and SIF, respectively. As a result, the multiplier MP1 provides a demodulated video signal VID. The multiplier MP2 mainly provides a TV sound carrier which is supplied to a TV sound channel. The TV sound channel comprises a filter CFS and an FM demodulator FMD which provides a TV sound signal AUD. The TV sound signal AUD can further be amplified and supplied to a loudspeaker (not shown).

The TV detection section incorporates a phase-lock loop PLL for synchronous detection. The phase-lock loop PLL is de-activateable by means of a switch SW included therein. For TV reception, the switch SW is in a state opposite to the state shown in the Figure, such that the phase-lock loop is active. Accordingly, a controllable oscillator VCO receives a synchronization error signal from a synchronization detector FPD. The controllable oscillator VCO provides an IF detection carrier which is supplied to multipliers MP1 and MP2.

In the case of FM broadcast reception, the arrangement operates differently. The tuner TUN frequency converts an FM broadcast signal, which is present at input INP, within the pass band of the IF section IFS. In the TV detector section TVD, the multiplier MP2 frequency converts the FM broadcast signal for a second time to approximately the center frequency of the filter CFS. To that end, the switch SW in the phase-lock loop PLL is in a state as shown in the Figure, such that the phase-lock loop PLL is not active. Accordingly, the controllable oscillator VCO is effectively free-running and provides a mixing carrier to the multiplier MP2. The frequency of mixing carrier can be adjusted by a DC voltage Vadj which is supplied to the controllable oscillator VCO. In this way, it is possible to fit the twice frequency converted FM broadcast signal suitably in the pass band of the filter CFS.

The TV detector section TVD further comprises circuitry for gain and frequency control. Controllable amplifiers AM1 and AM2 are coupled between the inputs VIF and SIF and the multipliers MP1 and MP2, respectively. Gain control circuits GC1 and GC2 derive gain control signals for the controllable amplifiers AM1 and AM2 from the output signals of multipliers MP1 and MF2, respectively. In addition, the gain control circuits GC1 and GC2 derive gain control voltages Vgc1 and Vgc2, respectively, which can be supplied to the TV tuner TUN. The FM detector FMD provides a voltage AFT which depends on the frequency of the signal which is demodulated in this arrangement.

The TV tuner TUN comprises an input filter RFF, an input amplifier RFA, a mixer RFM and a local oscillator LOC. The input filter RFF is controlled by a control signal TRC in accordance with the reception mode of the arrangement: TV or FM. The input filter RFF comprises an FM band-stop filter, not shown, which is operative in the TV reception mode. In the FM reception mode, this band-stop filter is de-activated. In the TV reception mode, the amplifier RFA is controlled in accordance with the gain control voltage Vgc1. In the FM reception mode, however, the amplifier RFA is controlled in accordance with the gain control voltage Vgc2. Further, in the FM reception mode, the frequency of the local oscillator LOC is adjusted by means of the voltage AFT. The voltage AFT is not used for that purpose in TV reception mode.

It should be noted that in the embodiment shown in the Figure, the TV IF section IFS is used for both TV and FM broadcast reception. This may seem unwise since the characteristics of the TV IF section IFS, in particular the bandwidth, are not very suited for FM broadcast reception. However, in practice, it proved that the FM broadcast reception was satisfactory for an appreciable amount of applications, notably in multi-media applications. In many applications, the environmental noise, for example, the noise produced by the fan of a multi-media apparatus, masks a low to medium fidelity audio quality. Furthermore, in many applications, the FM reception signals will descend from a cable network. Generally, the signal levels in cable networks are equalized such that strong signals adjacent to the desired FM broadcast signal are absent. Then, the relatively poor selectivity for FM broadcast reception in the TV-IF section IFS does not seriously degrade the FM reception quality.

While a single embodiment was shown and described by way of example, a person skilled in the art my conceive many other alternative embodiments within the scope of the invention claimed. To that respect, any reference signs used in a Claim, cannot be construed as limiting the Claim concerned.

It should be noted that, although the embodiment shown in the Figure is based on the QSS scheme, the invention can equally well be applied in an arrangement based on the ICS scheme, mentioned in the introductory portion of this specification.

It should further be noted that the second intermediate frequency for FM reception, does not have to be equal to the TV sound carrier frequency, which is about 5 MHz. For example, the second intermediate frequency may be 10,7 MHz, such that standard FM broadcast IF filters can be used. Such filters do not affect the sound quality as much as standard TV sound filter do, notably in the case of FM stereo broadcast reception. Referring to the Figure, a standard FM broadcast IF filter may be coupled in parallel to the filter CF8. Of course, the frequency of the controllable oscillator VCO should be such, that the twice frequency converted FM broadcast signal falls within the pass band of the standard FM broadcast filter. This can be achieved by suitably setting the DC voltage Vadj.

It should further be noted that in the FM reception mode, there are basically two alternative frequencies at which controllable oscillator VCO, shown in the Figure, may oscillate. The first alternative frequency is approximately the sum of the first and the second intermediate frequency for FM reception. The second alternative frequency is approximately the difference between the first and the second intermediate frequency for FM reception. The second alternative frequency may provide a dearly better FM reception than the first alternative frequency, or vice versa. The reason for this, is that the image frequency band, associated to the second frequency conversion, is different for the two alternative frequencies.

It should further be noted that the controllable oscillator VCO may use any type of resonant circuit, including a crystal or a ceramic element, to determine the oscillation frequency. Furthermore, a frequency control circuit may be used to keep the oscillation frequency within certain limits. The term free-running in this specification, is to be interpreted as not being synchronized with the TV IF carrier.

It should finally be noted that the TV detection section TVD can be implemented as an integrated circuit. Such an integrated circuit may, for example, be based on a TV IF integrated circuit of the type "TDA 9808" of Philips Semiconductors.

I claim:

1. An arrangement for receiving both TV and FM broadcast signals, the arrangement comprising a TV tuner for a first frequency conversion of an FM broadcast signal, and a combination of a mixer and an oscillator for a second frequency conversion of the FM broadcast signal, characterized in that said oscillator is included in a phase-lock loop for synchronous detection of a TV intermediate frequency signal, and in that said phase-lock loop comprises means for de-activating the phase-lock loop in the case of FM broadcast signal reception.

2. An arrangement as claimed in claim 1, wherein said mixer is part of a TV detection section arranged for Quasi Split Sound TV sound detection.

3. A multi-media apparatus comprising a personal computer having slots into which special function boards are plugged in, wherein one of said special function boards includes an arrangement for receiving both TV and FM broadcast signals, the arrangement comprising a TV tuner for a first frequency conversion of an FM broadcast signal, and a combination of a mixer and an oscillator for a second frequency conversion of the FM broadcast signal, characterized in that said oscillator is included in a phase-lock loop for synchronous detection of a TV intermediate frequency signal, and in that said phase-lock loop comprises means for de-activating the phase-lock loop in the case of FM broadcast signal reception.

4. A multi-media apparatus as claimed in claim 3, wherein said mixer is part of a TV detection section arranged for Quasi Split Sound TV sound detection.

* * * * *